United States Patent
Nagar et al.

(10) Patent No.: US 12,093,106 B2
(45) Date of Patent: Sep. 17, 2024

(54) AUGMENTED REALITY BASED POWER MANAGEMENT

(71) Applicant: International Business Machines Corporation, Armonk, NY (US)

(72) Inventors: Raghuveer Prasad Nagar, Kota (IN); Sarbajit K. Rakshit, Kolkata (IN); Saurabh Yadav, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 140 days.

(21) Appl. No.: 17/324,207

(22) Filed: May 19, 2021

(65) Prior Publication Data
US 2022/0374067 A1 Nov. 24, 2022

(51) Int. Cl.
*G06F 1/3212* (2019.01)
*G06F 1/30* (2006.01)
*G06T 19/00* (2011.01)

(52) U.S. Cl.
CPC .............. *G06F 1/3212* (2013.01); *G06F 1/30* (2013.01); *G06T 19/006* (2013.01)

(58) Field of Classification Search
CPC ........ G06F 1/3212; G06F 1/30; G06T 19/006
See application file for complete search history.

(56) References Cited

U.S. PATENT DOCUMENTS

| | | | |
|---|---|---|---|
| 8,717,363 B2 | 5/2014 | Contractor | |
| 9,419,444 B2 | 8/2016 | Eaton | |
| 9,946,317 B2 | 4/2018 | Backman | |
| 10,199,877 B2 | 2/2019 | Van Den Brink | |
| 11,222,477 B2 * | 1/2022 | Moon | G06F 3/012 |

(Continued)

FOREIGN PATENT DOCUMENTS

| | | |
|---|---|---|
| CN | 102393796 A | 3/2012 |
| WO | 2015034560 A1 | 3/2015 |

OTHER PUBLICATIONS

Mell et al., "The NIST Definition of Cloud Computing", Recommendations of the National Institute of Standards and Technology, Special Publication 800-145, Sep. 2011, 7 pages.

(Continued)

*Primary Examiner* — Aurel Prifti
(74) *Attorney, Agent, or Firm* — CANTOR COLBURN LLP; Robert D. Bean

(57) ABSTRACT

A computer device trains a neural network to determine power recharging directions between sets of computing devices based on historical computing device data and historical user eye data. The computing device receives, from an augmented reality device, computing device data pertaining to a first computing device and a second computing device, and user eye data pertaining to a user associated with the first computing device and the second computing device. The computing device determines a power recharging direction between the first computing device and the second computing device based, at least in part, on providing the received computing device data and the received user eye data as input to the neural network, resulting in an identification of a source computing device and a target computing device. The computing devices triggers a power recharging cycle, wherein the source computing device transfers direct current power to the target computing device.

17 Claims, 7 Drawing Sheets

(56) References Cited

U.S. PATENT DOCUMENTS

| | | | |
|---|---|---|---|
| 2005/0151511 A1* | 7/2005 | Chary | G06F 1/263 320/127 |
| 2007/0236975 A1 | 10/2007 | Lippojoki | |
| 2015/0089248 A1* | 3/2015 | Obie | G06F 1/266 713/300 |
| 2015/0177834 A1* | 6/2015 | Karakotsios | G06V 40/18 345/156 |
| 2015/0261293 A1* | 9/2015 | Wilairat | G08C 17/02 345/156 |
| 2016/0119290 A1* | 4/2016 | Balasubramanian | G06F 21/6254 726/30 |
| 2016/0203641 A1* | 7/2016 | Bostick | G06T 19/006 345/633 |
| 2016/0246384 A1* | 8/2016 | Mullins | G06F 3/017 |
| 2016/0274762 A1* | 9/2016 | Lopez | G06T 19/006 |
| 2017/0045932 A1* | 2/2017 | Bostick | G06Q 10/06 |
| 2017/0060207 A1* | 3/2017 | Backman | G06F 1/266 |
| 2018/0196510 A1* | 7/2018 | Liu | H04W 76/10 |
| 2018/0219386 A1* | 8/2018 | Zhang | H02J 7/342 |
| 2018/0239422 A1* | 8/2018 | Beaman | G02B 27/017 |
| 2018/0262014 A1* | 9/2018 | Bell | H02J 50/20 |
| 2020/0221559 A1 | 7/2020 | Wendt | |
| 2020/0225747 A1* | 7/2020 | Bar-Zeev | G06T 7/74 |
| 2021/0011288 A1* | 1/2021 | Lai | G06N 3/063 |
| 2021/0132690 A1* | 5/2021 | Yudanov | G06F 3/0487 |
| 2021/0273858 A1* | 9/2021 | Radovanovic | H02J 3/00 |
| 2021/0293334 A1* | 9/2021 | Gaiser | F16D 63/006 |
| 2021/0349534 A1* | 11/2021 | Eil | A61B 34/25 |
| 2021/0368136 A1* | 11/2021 | Chalmers | G06F 3/011 |
| 2022/0006330 A1* | 1/2022 | AbuKhalaf | H02J 50/80 |
| 2022/0174131 A1* | 6/2022 | Lecesne | G06T 19/006 |
| 2022/0229524 A1* | 7/2022 | McKenzie | G06F 3/0481 |

OTHER PUBLICATIONS

Whitwam, Ryan, "Wireless power system charges devices up to 20 feet away", Extreme Tech, Jan. 6, 2015, 8 pages.

* cited by examiner

AUGMENTED REALITY BASED POWER MANAGEMENT

BACKGROUND OF THE INVENTION

The present invention relates generally to the field of augmented reality systems, and more particularly to aspects relating to power management.

Generally, a rechargeable battery is an electrical battery which can be charged, discharged, and recharged many times. Rechargeable batteries power everything from small electronic devices to larger devices such as automobiles. Rechargeable batteries generally charge via docking stations and power outlets connected to a municipal power grid.

SUMMARY

Embodiments of the present invention provide a method, system, and program product.

A first embodiment encompasses a method. One or more processors train a neural network to determine power recharging directions between sets of computing devices based, at least in part, on: (i) historical computing device data, and (ii) historical user eye data. One or more processors receive from an augmented reality device, (i) computing device data pertaining to a first computing device and a second computing device, and (ii) user eye data pertaining to a user associated with the first computing device and the second computing device. One or more processors determine a power recharging direction between the first computing device and the second computing device based, at least in part, on providing the received computing device data and the received user eye data as input to the neural network, resulting in an identification of a source computing device and a target computing device. One or more processors trigger a power recharging cycle, wherein the source computing device transfers direct current (DC) power to the target computing device.

A second embodiment encompasses a computer program product. The computer program product includes one or more computer-readable storage media and program instructions stored on the one or more computer-readable storage media. The program instructions include program instructions to train a neural network to determine power recharging directions between sets of computing devices based, at least in part, on: (i) historical computing device data, and (ii) historical user eye data. The program instructions include program instructions to receive from an augmented reality device, (i) computing device data pertaining to a first computing device and a second computing device, and (ii) user eye data pertaining to a user associated with the first computing device and the second computing device. The program instructions include program instructions to determine a power recharging direction between the first computing device and the second computing device based, at least in part, on providing the received computing device data and the received user eye data as input to the neural network, resulting in an identification of a source computing device and a target computing device. The program instructions include program instructions to trigger a power recharging cycle, wherein the source computing device transfers direct current (DC) power to the target computing device.

A third embodiment encompasses a computer system. The computer system includes one or more computer processors, one or more computer-readable storage media, and program instructions stored on the computer-readable storage media for execution by at least one of the one or more processors. The program instructions include program instructions to train a neural network to determine power recharging directions between sets of computing devices based, at least in part, on: (i) historical computing device data, and (ii) historical user eye data. The program instructions include program instructions to receive from an augmented reality device, (i) computing device data pertaining to a first computing device and a second computing device, and (ii) user eye data pertaining to a user associated with the first computing device and the second computing device. The program instructions include program instructions to determine a power recharging direction between the first computing device and the second computing device based, at least in part, on providing the received computing device data and the received user eye data as input to the neural network, resulting in an identification of a source computing device and a target computing device. The program instructions include program instructions to trigger a power recharging cycle, wherein the source computing device transfers direct current (DC) power to the target computing device.

DETAILED DESCRIPTION

Figure 1:
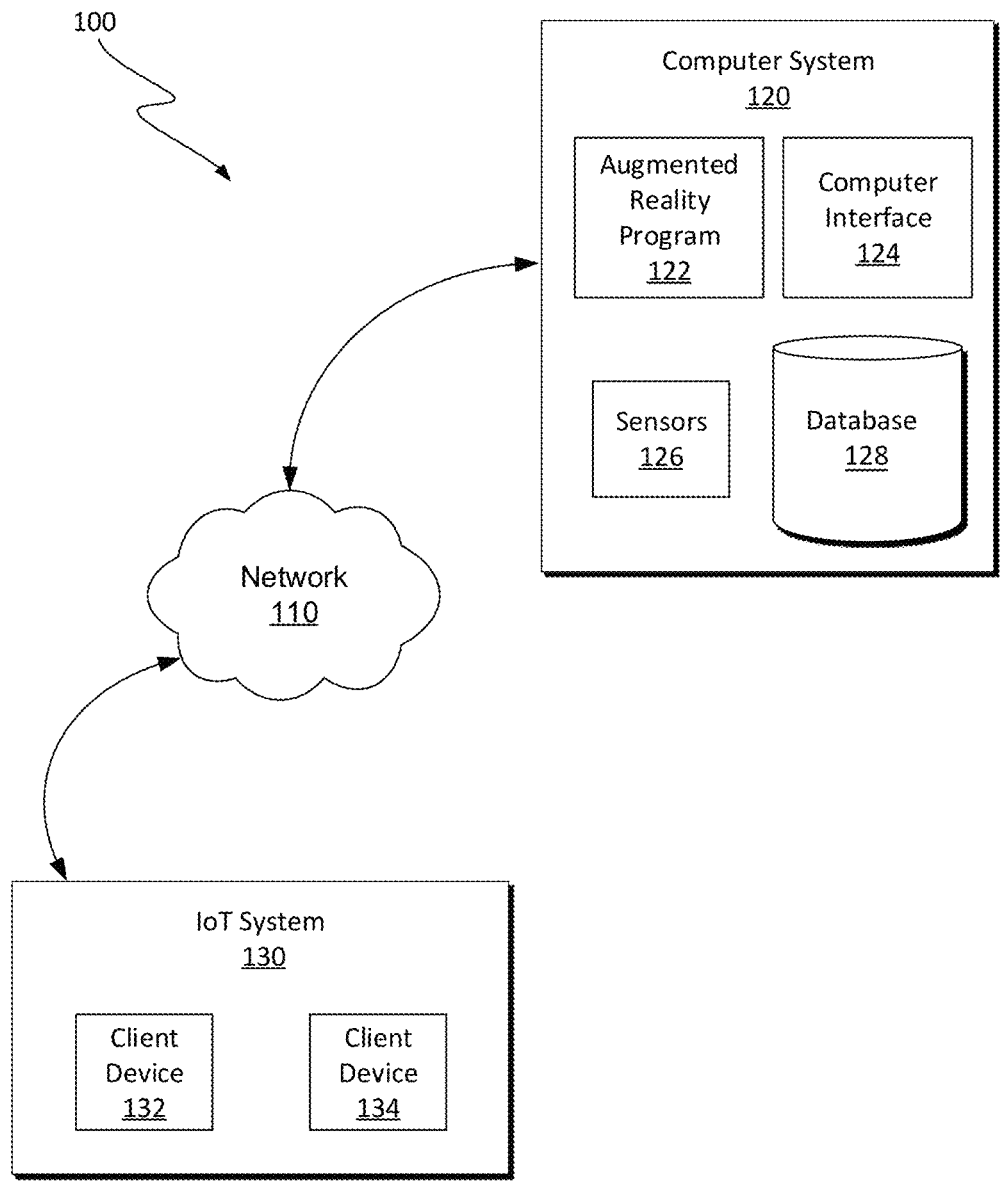
FIG. 1 is a functional block diagram illustrating a computing environment in which a system configures a power recharging cycle, in accordance with an exemplary embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the present invention recognize that in a modernized digital environment, technology can be utilized to provide for DC power transfer between two or more rechargeable batteries connected to two or more computing devices. Embodiments of the present invention provide for a more efficient and effective experience for users to transfer power between two or more computing devices. Furthermore, embodiments of the present invention provide for a system to configure two or more computing devices to transfer power between the two or more computing devices while a user utilizes an augmented reality system to establish the power recharging cycle.

Embodiments of the present invention provide a technological improvement over known solutions for power charging of electronic devices by using, for example, augmented reality eyewear. Embodiments of the present invention improve over conventional systems by providing more efficient power charging for electronic devices that, in turn, reduces the overall load and dependency on the power grid. Embodiments of the present invention recognize that a computer system would also see a decrease in load because the system would more efficiently and accurately identify two or more computing devices to configure the power charge direction for the computing devices. Embodiments of the present invention further recognize that the incorporation of augmented reality allows for the system to determine computing devices to be utilized in power sharing in real time and allow for users to efficiently and quickly adjust the direction of power charging to reduce time spent locating a free power outlet on a wall or ensuring that a portable charging device has enough power to effectively charge a computing device.

The present invention will now be described in detail with reference to the Figures.

FIG. 1 is a functional block diagram illustrating computing environment, generally designated 100, in accordance with an embodiment of the present invention. Computing environment 100 includes computer system 120 and IoT system 130. Computer system 120 includes augmented reality program 122, computer interface 124, sensors 126, and database 128. IoT system 130 includes client device 132 and client device 134.

In various embodiments of the present invention, computer system 120 is a computing device that can be a standalone device, a server, a laptop computer, a tablet computer, a netbook computer, a personal computer (PC), a personal digital assistant (PDA), an augmented reality eyewear or headset, a smartwatch, a desktop computer or any programmable electronic device capable of executing machine readable program instructions and communications with IoT system 130. In another embodiment, computer system 120 represents a computing system utilizing clustered computers and components to act as a single pool of seamless resources. In general, computer system 120 can be any computing device or a combination of devices with access to IoT system 130, and network 110 and is capable of executing augmented reality program 122, computer interface 124, sensors 126, and database 128. Computer system 120 may include internal and external hardware components as depicted and described in further detail with respect to FIG. 7.

In this exemplary embodiment, augmented reality program 122 and computer interface 124 are stored on computer system 120. However, in other embodiments, augmented reality program 122 and computer interface 124 may be stored externally and accessed through a communication network, such as network 110. Network 110 can be, for example, a local area network (LAN), a wide area network (WAN) such as the Internet, or a combination of the two, and may include wired, wireless or any other connection known in the art. In general, network 110 can be any combination of connections and protocols that will support communications between computer system 120 and IoT system 130, in accordance with a desired embodiment of the present invention.

Augmented reality program 122 is depicted in FIG. 1 for illustrative simplicity. In various embodiments of the present invention, augmented reality program 122 represents logical operations executing on computer system 120, where computer interface 124 manages the ability to view these logical operations and their results on computer system 120. Computer system 120 can include any number of logical operations that are managed and executed in accordance with augmented reality program 122. In some embodiments, augmented reality program 122 represents a program that analyzes input and output (I/O) data. Additionally, augmented reality program 122, when executing, operates to monitor the I/O that was analyzed and generates a modification based on, but not limited to, the analyzation operation. In some embodiments, augmented reality program 122 determines whether a specific action is likely to take place and generates a modification request and communicates a notification to IoT system 130 that a modification or reconfiguration is required for client device 132 and client device 134 within IoT system 130.

Computer system 120 includes computer interface 124. Computer interface 124 provides an interface between computer system 120 and IoT system 130. In some embodiments, computer interface 124 can be a graphical user interface (GUI), a web user interface (WUI), or an image projector and can display text, documents, web browser, windows, user options, application interfaces, instruction for operation, images, and holography display, and includes the information (such as graphic, text, and sound) that a program presents to a user and the control sequences the user employs to control the program. In some embodiments, computer system 120 accesses data communicated from IoT system 130 via a client-based application that runs on computer system 120. For example, computer system 120 includes mobile application software that provides an interface between computer system 120 and IoT system 130.

In various embodiments of the present invention, client device 132 and client device 134 represent portable computing devices capable of executing machine readable program instructions and communications with computer system 120 and within IoT system 130. In various embodiments, computing environment 100 includes additional various portable computing devices (i.e., a tablet computer, a smartwatch, a smartphone, a hand-held telephone) not shown. In another embodiment, client device 132 and client device 134 represent a computing system utilizing clustered computers and components to act as a single pool of seamless resources with access to computer system 120 and network 110. Client device 132 and client device 134 may include internal and external hardware components as depicted and described in further detail with respect to FIG. 7.

Sensors 126 are depicted in FIG. 1 for illustrative simplicity. In various embodiments of the present invention, sensors 126 represent various computing devices executing on computing system 120, where sensors 126 communicate data to augmented reality program 122. In various embodiments, sensors 126 represent computing devices that are capable of tracking a user's eye movements (i.e., sensor-based eye tracking (EOG)) and gestures. Additionally, in various embodiments, sensors 126 are tracking the user's field of vision and capturing which computing devices the user is staring at (i.e., the user's field of vision).

In various embodiments, client device 132 and client device 134 include sensors that operate to transfer power wirelessly between two or more computing devices without the support of electrical cords or components that physically connect the two or more computing devices. In various embodiments, additionally, the sensors operate to receive the radio frequency from one computing device and convert the radio frequency transmissions into direct-circuit (DC) power. In various embodiments, augmented reality program 122 determines the connection between two or more computing devices via Bluetooth connection, where this connection directs the wireless power signal from one computing device to another computing device. Embodiments of the present invention recognize that for the Bluetooth connection between the two or more computing devices a tight cone of electromagnetic waves are focused from the first computing device to a second computing device. Embodiments of the present invention further recognize that security relating to the wireless power transfer between the two or more computing devices is an important factor. In various embodiments, the Bluetooth connection between the two or more computing devices used to direct beam-forming authenticates the two or more computing devices, additionally, the wireless connection executes in a protected mode where only authorized computing devices are capable of connecting to one another and transferring power. Embodiments of the present invention provide that the Bluetooth connection that is established between the two or more computing devices also operates to authenticate the two or more computing devices. In various embodiments, the wireless power recharging cycle between the two or more computing devices operates in a protected mode where only authorized devices can connect to one another. In various embodiments, augmented reality program 122 when executing the power recharging cycle operates to authenticate the computing devices belong to an authorized user before generating the modification request. In various embodiments, the sensors operating on client device 132 and client device 134 determine whether a power recharging cycle is likely to take place and generate data that is communicated to augmented reality program 122, wherein augmented reality program 122 generates a direction modification and communicates the direction modification to client device 132 and client device 134.

In various embodiments, augmented reality program 122 communicates with database 128 and accesses (i) data associated with two or more computing devices (i.e., client device 132 and client device 134), (ii) user data regarding the two or more computing devices, and (iii) environmental data regarding the rechargeable battery levels of the two or more computing devices and whether the computing devices are in a threshold level of distance from one another.

In various embodiments of the present invention, augmented reality program 122 receives I/O data in the form of user data and computing device data. Augmented reality program 122 analyzes the data and prepares a direction modification for client device 132 and client device 134. In various embodiments, augmented reality program 122 communicates the data that represents the direction modification with program instructions instructing client device 132 and client device 134 executing within IoT system 130, where the donor computing device (also referred to as a source computing device) transfers DC power to the receiving computing device (also referred to as a target computing device). In various embodiments, the donor computing device represents the computing device used to supply DC power to recharge another computing device. Additionally, in various embodiments, the receiving computing devices represents the computing device receiving the DC power from the donor computing device to recharge the battery within the receiving computing device.

In various embodiments of the present invention, augmented reality program 122 continuously monitors data from client device 132 and client device 134 executing within the IoT system 130. In various embodiments, augmented reality program 122 monitors at various time periods the power levels of the rechargeable batteries of the computing devices (i.e., client device 132 and client device 134) within IoT system 130. In various embodiments, augmented reality program 122 identifies a direction request from a user of computer system 120 (i.e., a user wearing augmented reality eyewear/headset, where augmented reality program 122 is executing on the augmented reality eyewear/headset) where the direction request identifies the donor computing device and the receiving computing device. Additionally, the direction request further identifies the threshold level of power to be transferred from the donor computing device to the receiving computer device. In various embodiments, augmented reality program 122 analyzes data received from sensors executing on the two or more computing devices within IoT system 130. In this embodiment, augmented reality program 122 communicates a set of program instructions to client device 132 and client device 134 that define the donor computing device and receiving computing device and instruct the transfer of power from the donor computing device to the receiving computing device.

FIG. 1 includes multiple computing devices (i.e., client device 132 and client device 134) and one or more sensors (i.e., sensors 136) that monitor the computing devices to identify data to communicate to augmented reality program 122. In various embodiments, a user defines which computing device's battery must be recharged (i.e., a receiving computing device) and which computing device will supply power to recharge the receiving computer device (i.e., a donor computing device).

Embodiments of the present invention provide that augmented reality program 122 will utilize historical data as training to determine different configurations for computing devices and identification of the power requirement needed to recharge the battery of the receiving computer device. Additionally, augmented reality program 122 identifies computer device data that includes one or more of, but is not limited to, battery power levels, distance between two or more computer devices, time and date, and the type of connection needed to transfer power between the two or more computing devices. In various embodiments, augmented reality program 122 utilizes the computer device data to establish a connection between the two or more computer devices within a threshold level of space/distance between the two or more computing devices. In various embodiments, augmented reality program 122 communicates data related to the power recharging of the receiving computer device to two or more computing devices. In various embodiments, the augmented reality program 122 communicates computer device data that includes, but is not limited to, battery power levels, distance between two or more computer devices, time and date, and the type of connection needed to transfer power between the two or more computing devices to a user of computer system 120. In various embodiments, augmented reality program 122 communicates direction modifications to two or more computer devices (e.g., client device 132 and client device 134) to define the donor computer device and the receiving computer device. In various embodiments, augmented reality program 122 operates to communicate program instructions triggering the power recharging cycle, where the donor computing device begins the power recharging cycle to the receiving computer device.

In various embodiments, if augmented reality program 122 identifies that one or more computer devices within the IoT system 130 have no battery power left or are at a threshold value of battery power that cannot transfer power to the receiving computer device, then augmented reality program 122 determines that the source computing device and the target computing device can no longer sustain a power transfer. In various embodiments, in response to determining that the source computing device and the target computing device can no longer sustain the power transfer, then augmented reality program 122 triggers an end to the power recharging cycle. In various embodiments, augmented reality program 122 generates an alert and communicates the alert to the user of computer system 120 that the two or more computing devices within IoT system 130 must be recharged using a static power supply (i.e., wall power outlet). In various embodiments, augmented reality program 122 monitors the power recharging cycle between the donor computer device and the receiving computer device.

In various embodiments, augmented reality program 122 receives data from sensors 126 related to power recharging of the two or more computer devices. In various embodiments, augmented reality program 122 identifies the battery levels of the two or more computer devices and determines whether one of the two or more computer devices requires a recharge of its internal battery. In various embodiments, augmented reality program 122 further determines whether one of the two or more computer devices is capable of transferring DC power to at least one other computer device of the two or more computer devices. In various embodiments, augmented reality program 122 generates a direction modification with program instructions instructing the first computing device that it is the donor computing device, to begin a power recharging cycle, and to transfer power to the second computing device, which is the receiving computing device.

In various embodiments, a user operates computer system 120, where computer system 120 represents an augmented reality eyewear or headset. Additionally, computer system 120 includes sensors that track the user's eye movements and eye gestures. In various embodiments, augmented reality program 122 tracks the user's direction movement and gestures, where the user looks at the source device and transfers their gaze to the target device. In various embodiments, the user communicates to augmented reality program 122, utilizing eye movement and gestures, which computing device is the source device and which computing device is the target device of the power recharge cycle. In various embodiments, augmented reality program 122 tracks the user's eye movement from a first device to a second device, where the change in the focus of the eye movement from the first device to the second device indicates that the first device is the source device, and the second device is the target device, as will be discussed in further detail below.

In various embodiments, augmented reality program 122 tracks the user's eye movement, where the user is capable of changing the direction of the power recharging cycle between two or more computing devices. In various embodiments, augmented reality program 122 tracks the user's eye movement and identifies when the user changes the source device and the target device based on, at least, the eye movement and gesture of the user. Embodiments of the present invention provide for a multi-device ecosystem, where a plurality of computing devices are present within a predefined area. In various embodiments, the batteries of one or more computing devices can be recharged from a power source of a singular computing device. In various embodiments, the batteries of one or more computing devices can be recharged from a power source of one or more computing devices. In various embodiments, augmented reality program 122 tracks the focus of the user's eyes and identifies the direction the user wishes to define the power recharging cycle of the batteries for one or more computing devices. In various embodiments, augmented reality program 122 identifies the source device the user wishes to transfer DC power from and the target device that the user wishes to transfer DC power to.

In various embodiments, augmented reality program 122 communicates to the user of computer system 120 the battery levels of each identified computing devices within the user's field of vision (i.e., two or more computing devices). In various embodiments, augmented reality program 122 receives data from the user identifying how much power the user wishes to transfer from the source device to the one or more target devices. Additionally, augmented reality program 122 receives data from the user who wishes to pause, resume, or stop the transfer of DC power from the source device to the one or more target devices. In various embodiments, augmented reality program 122 communicates a direction modification to the two or more computing devices (i.e., source device and target device) to initiate the power recharging cycle based on, at least, the eye movement and gesture provided by the user of computing system 120, as will be discussed in further detail below.

Embodiments of the present invention provide that augmented reality program 122 will utilize historical training data to predict when to trigger the power recharging cycle between various computing devices. In various embodiments, augmented reality program 122 learns the pattern of power recharging cycle between two or more computing devices based on, at least, previously generated direction modifications from a user of computer system 120 or historical training data provided to a R-CNN (i.e., region-based convolutional neural network). In various embodiments, the R-CNN includes I/O data, as well as multiple hidden layers of neurons (e.g., RELU layer). Augmented reality program 122 analyzes the (i) the input data of the CNN and (ii) the change in the output variables, at least. In various embodiments, the input data relates to user eye data as the user looks around within an environment (e.g., user's field of vision) and computing device data that relates to the plurality of computing devices within the user's field of vision, and the output data relates to the correlation between the user eye data and the computing device data regarding which computing device requires a battery recharge (e.g., target computing device) and which computing devices (e.g., source computing devices) are capable of transferring a threshold value of battery power to the target computing device. In various embodiments, augmented reality program 122 analyzes the output data of the R-CNN, wherein the output data represents a scaled numeric variable based, at least on, (i) the input data and (ii) the weights assigned to each input data through the one or more layers of the R-CNN, where the output data describes the relation of the source computing device to the target computing device. Embodiments of the present invention recognize that the output data is associated with one or more computing devices and the related data and user eye data. Additionally, in various embodiments, augmented reality program 122 will learn to trigger power recharging cycles based on, at least, the current battery levels of two or more computing devices, where the target computing device has reached a threshold level of low battery level and requires a recharge from a source device within proximity to the target device. In various embodiments, augmented reality program 122 generates a recommendation for the user of client device 132 and client device 134.

In various embodiments, augmented reality program 122 generates a recommendation for power transfer between two or more computing devices with program instructions coaching the user which computing device is the receiving computing device and computing device that will donate the power to the receiving computing device. In various embodiments, augmented reality program 122 determines the threshold value of the battery power levels of both the donor computing device and the receiving computing device, and augmented reality program 122 further determines the amount of power to be transferred. In various embodiments, augmented reality program 122 performs the power transfer between the donor computing device and the receiving device automatically based, at least in part, on historical training data and user feedback. In various embodiments, augmented reality program 122 learns from user feedback when a power transfer between the donor computing device and the receiving computing device is required. Additionally, in various embodiments, augmented reality program 122 receives verbal and/or gestured communications from the user to initiate the power transfer between the donor computing device and the receiving computing device.

Figure 2:
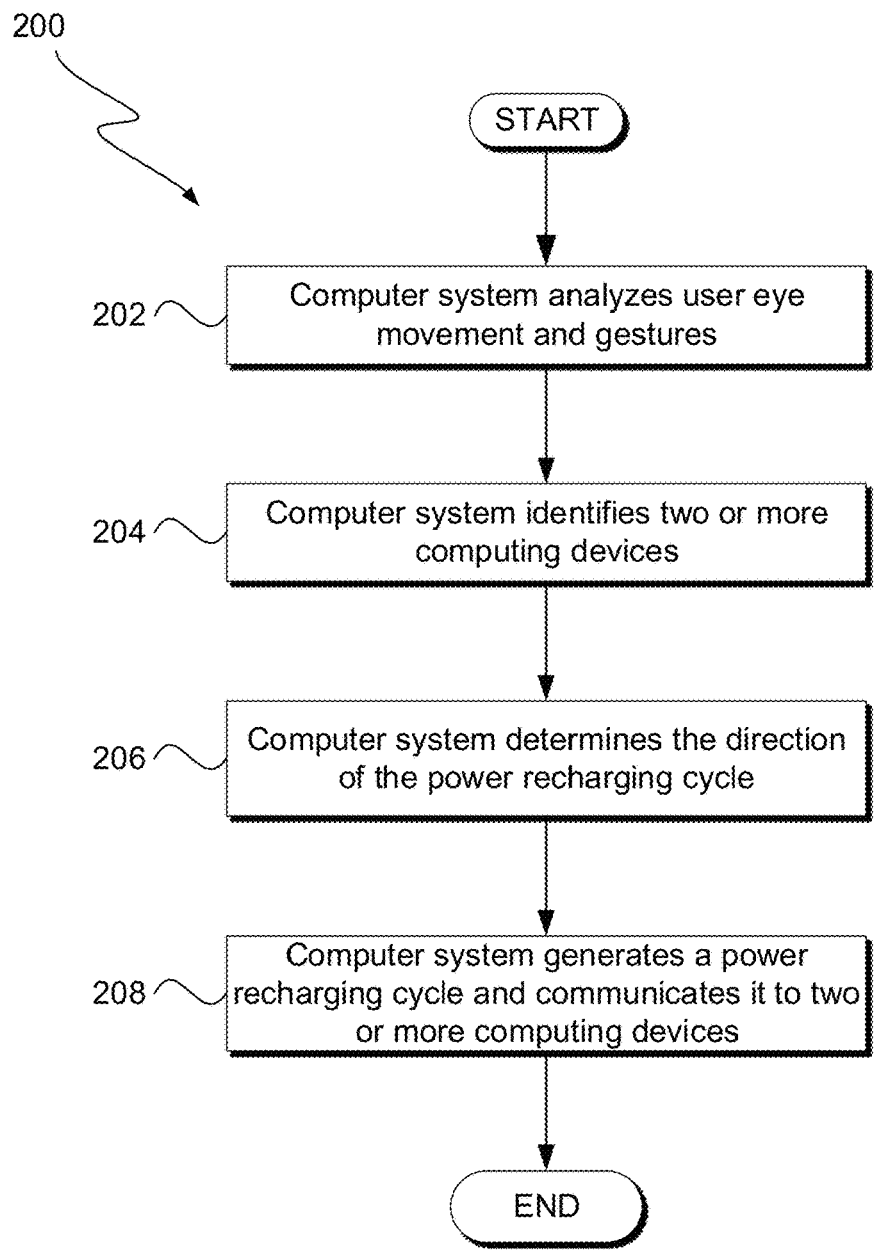
FIG. 2 is a flowchart which illustrates the operational processes of a system generating a request to configure the power recharging cycle between two or more computing devices on a computing device within the environment of FIG. 1, in accordance with an exemplary embodiment of the present invention.

FIG. 2 is a flowchart depicting operations configuring computing devices to trigger a power recharging cycle for computing environment 100, in accordance with an illustrative embodiment of the present invention. More specifically, FIG. 2, depicts combined overall operations 200, of augmented reality program 122. In some embodiments, operations 200 represents logical operations of augmented reality program 122, wherein augmented reality program 122 represents interactions between logical computing devices communicating with computer system 120 and various other computing devices connected to network 110. It should be appreciated that FIG. 2 provides an illustration of one implementation and does not imply any limitations with regard to the environments in which different embodiments may be implemented. Many modifications to the depicted environment may be made. In one embodiment, the series of operations, in flowchart 200, can be terminated at any operation. In addition to the features previously mentioned, any operations of flowchart 200, can be resumed at any time.

In operation 202, augmented reality program 122 analyzes user eye movement and gestures (i.e., sensor-based eye tracking). In various embodiments, augmented reality program 122 identifies that a user has equipped an augmented reality eyewear or headset (i.e., computer system 120). In various embodiments, sensors 136 execute on IoT system 130. In various embodiments, sensors 126 include, but are not limited to, (i) video cameras that are directed outward to capture the field of visions the user is looking at, and (ii) eye motion cameras that track and capture the user's eye movement and gestures. In various embodiments, augmented reality program 122 receives user eye data from sensors 126 regarding the user's eye movement and gestures. In various embodiments, sensors 126 identify the direction of the user's eye movement that includes, for example: (i) the user staring in a static straight direction, (ii) the user's eyes moving to the left or right, (iii) the user's eyes looking up and down, and (iv) the user's eye looking in any angle within a one-hundred and eighty (180) degree range of movement. In various embodiments, augmented reality program 122 determines the direction and angle of the user's eye focus based on the movement of the user's eye, as discussed above. In various embodiments, augmented reality program 122 further determines the user's eye gestures as it relates to a command for augmented reality to act. In various embodiments, the user's eye gesture includes, but is not limited to, (i) blinking with both eyes once, (ii) blinking with both eyes twice, (iii) blinking with the left eye, and (iv) blinking with the right eye. In various embodiments, the user can define the identification of the one or more source devices and the one or more target devices based on, at least, a pre-determined eye gesture. In one example embodiment, the user defines that blinking once with the user's left eye selects one or more source devices that the user's field of vision and gaze is upon and that blinking once with the user's right eye selects one or more target devices that the user's field of vision and gaze is upon.

In operation 204, augmented reality program 122 identifies two or more computing devices. In various embodiments, augmented reality program 122 receives computing device data from sensors 126, where sensors 126 executing on computer system 120 identify two or more computing devices within the field of vision of the user. In various embodiments, the field of vision of the user represents the direction and angle that the user is staring with the user's eyes. In various embodiments, sensors 126 track and monitor the user's eye movement as the user's field of vision changes as the user looking within a three-hundred and sixty (360) degree rotation within an x-y-z plane. In various embodiments, the sensors 126 identify a first computing device within the user's field of vision and as the user changes the field of vision by changing direction and angle of the user's eyes, head, and body, sensors 126 identify, at least, a second computing device within the user's new field of vision. In various embodiments, sensors 126 identify a first computing device and at least a second computing device within the user's first field of vision without the user's having to change the field of visions by changing the direction and angle of the user's eye, head, and body. In various embodiments, sensors 126 identify a first computing device and at least a second computing device within the user's field of vision and sensors 126 further identify at least a third computing device, where the user changes the field of vision by changing the direction and angle of the user's eye, head, and body.

In operation 206, augmented reality program 122 determines the direction of the power recharging cycle. In various embodiments, augmented reality program 122 correlates the data received regarding the user's eye movement and gestures with the data regarding the identified two or more computing devices. In various embodiments, augmented reality program 122 determines which computing device is the source device based on, at least, (i) the user's eye gesture of blinking with one eye, blinking once with both eyes, and blinking with the left eye or (ii) the transition of the user's field of vision from the first computing device (i.e., source device) to the, at least, second computing device (i.e., target device). Additionally, augmented reality program 122 determines which computing device is the target device based on, at least, (i) the user's gesture of blinking twice with one eye, blinking twice with both eyes, and blinking with the right eye or (ii) the transition of the user's field of vision from the first computing device (i.e., source device) to the, at least, second computing device (i.e., target device). In various embodiments, augmented reality program 122 determines the direction modification of the power recharging cycle by the identification of the source device for the transfer of power to the target device.

In various embodiments, augmented reality program 122 determines that the user wishes to know the battery level percentages of the two or more computing devices. In various embodiments, augmented reality program 122 receives data from sensors 126 and determines that based on, at least, the user's eye movement and gestures that the user wishes to know the battery level percentages. In various embodiments, augmented reality program 122 communicates a request to the user with program instructions coaching the user how to set a control for the user to communicate to augmented reality program 122 that the user wishes to learn the battery level percentages of the various computing devices. In various embodiments, the control set by the user includes any combination of eye movement and gestures that the user wishes to utilize. In various embodiments, augmented reality program 122 analyzes the user eye data received from sensors 126 and determines that the user has requested the battery level percentages of the various computing devices within the user's field of vision. In various embodiments, augmented reality program 122 communicates a request to client device 132 and client device 134 executing within IoT system 130 with program instructions instructing client device 132 and client device 134 to communicate the battery level percentages of their respect device.

In operation 208, augmented reality program 122 generates a power recharging cycle and communicates it to two or more computing devices. In response to augmented reality program 122 determining the configuration of the power recharging cycle, augmented reality program 122 generates a power recharging cycle with program instructions and communicates the power recharging cycle to the two or more computing devices. In various embodiments, as discussed above, augmented reality program 122 determines the, at least, one source device and the, at least, one target device of the power recharging cycle. In various embodiments, the power recharging cycle instructs the identified, at least, one source device to trigger the transfer of power and transfer DC power from the source device's rechargeable battery to the target device's rechargeable battery utilizing DC power transfer systems known in the art. Additionally, in various embodiments, the power recharging cycle instructs the identified, at least, one target device to trigger the transfer of power and accept the transferred DC power from the source device. Embodiments of the present invention recognize that rechargeable batteries known in the art or in the future contain converters that are capable of storing power and releasing power based on, at least, receiving a set of program instructions instructing the rechargeable battery to switch to a power supply.

Embodiments of the present invention provide that there can be one or more source devices transferring DC power to the, at least, one target device and that there can be one or more target devices that receive transferred DC power from one or more source devices. Embodiments of the present invention are not limited to the transfer of DC power from one source device to one target device and that embodiments of the present invention recognize that any number of source devices and target devices may exist within the power recharging cycle.

Figure 3:
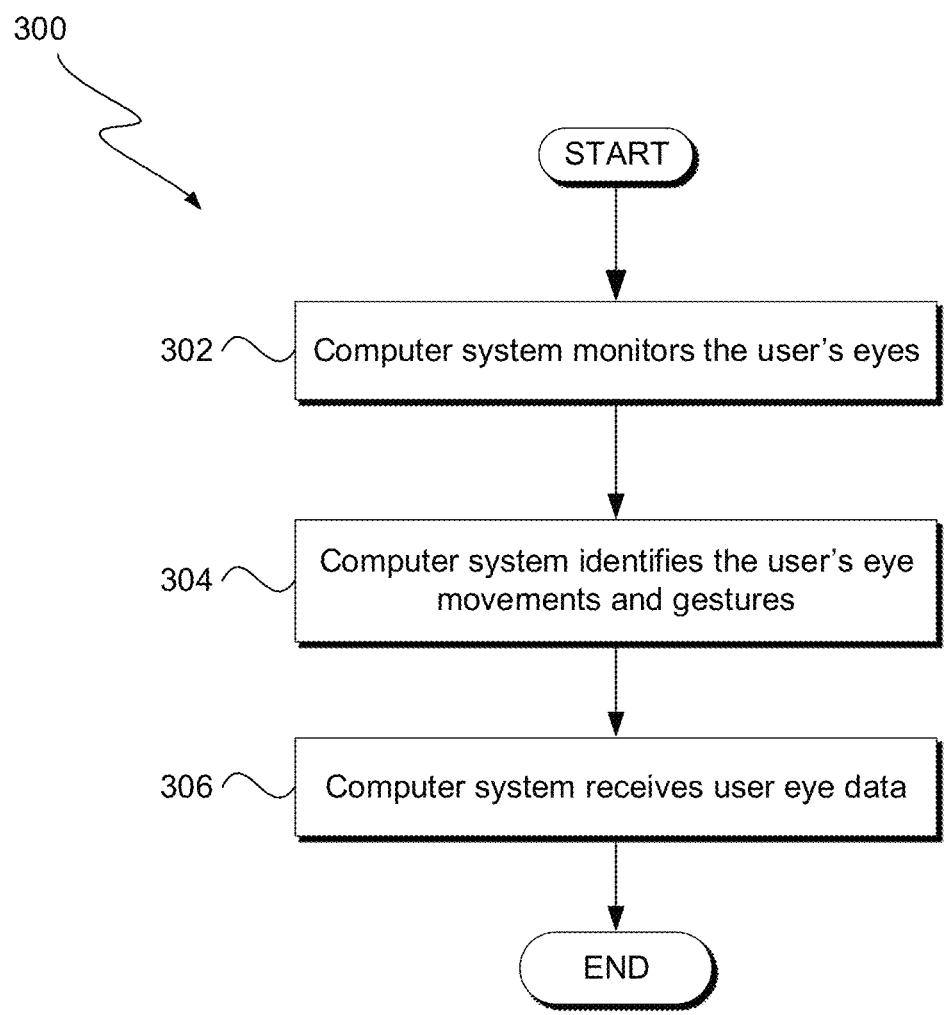
FIG. 3 is a flowchart which illustrates the operational processes of a system for tracking user eye movement and gestures on a computing device within the environment of FIG. 1, in accordance with an exemplary embodiment of the present invention.

FIG. 3 depicts flowchart, 300, depicting operations of augmented reality program 122 in computing environment 100, in accordance with an illustrative embodiment of the present invention. More specifically, FIG. 3, depicts combined overall operations, 300, of augmented reality program 122 executing on computer system 120. In some embodiments, operations 300 represents logical operations of augmented reality program 122, wherein interactions between augmented reality program 122, client device 132, client device 134, and sensors 126 represent logical units executing on computer system 120. Further, operations 300 can include a portion or all of combined overall operations of 200. In various embodiments, the series of operations 300, can be performed at the conclusion of operations 200. In some embodiments, operations 300 can be performed simultaneously with operations 200. It should be appreciated that FIG. 3 provides an illustration of one implementation and does not imply any limitations with regard to the environments in which different embodiments may be implemented. Many modifications to the depicted environment may be made. In one embodiment, the series of operations, of flowchart 300, can be performed simultaneously. Additionally, the series of operations, in flowchart 300 can be terminated at any operation. In addition to the features previously mentioned, any operations of flowchart 300 can be resumed at any time.

In operation 302, sensors 126 monitors the user's eyes. In various embodiments, sensors 126 execute on computer system 120 (i.e., an augmented reality eye wear or headset). In various embodiments, sensors 126 include computing devices, but are not limited to, video cameras, retina scanners, and infrared LEDs and infrared cameras. In various embodiments, sensors 126 track the user's eyes and monitors when the user moves or changes.

In operation 304, sensors 126 identifies the user's eye movements and gestures. In various embodiments, sensors 126 capture the infrared light as the infrared light reflects off of the user's eye and iris and sensors 126 store the infrared reflection as user eye data on database 128. In various embodiments, sensors 126 identify when then user's eyes move and when the user makes a gesture (i.e., blinking). In one example embodiment, sensors 126 identify when the user moves their eyes and looks to the right. In this one example embodiments, sensors 126 capture this movement through the use of the infrared light reflection and stores this user eye data on database 128. In a second example embodiment, sensors 126 identify that the user performs a gesture (i.e., blinking) and stores this as user eye data on database 128.

In operation 306, augmented reality program 122 receives user eye data. In various embodiments, augmented reality program 122 communicates with database 128 and retrieves the user eye data stored on database 128 communicated by sensors 126. In an alternative embodiment, augmented reality program 122 communicates a set of program instructions to sensors 126 instructing sensors 126 to communicate all captured user eye data to augmented reality program 122. In various embodiments, augmented reality program 122 analyzes the user eye data and correlates the user eye data with the computing device data received from sensors 126. In various embodiments, augmented reality program 122 determines which computing devices are within the user's field of vision and further determines which gestures the user has made such as, but not limited to, blinking with one eye or blinking with both eyes (i.e., establishing the source device and the target device, requesting the threshold value of the battery power levels, etc.). In various embodiments, augmented reality program 122 configures the two or more computing devices and generates a direction modification to initiate the power recharging cycle.

Figure 4:
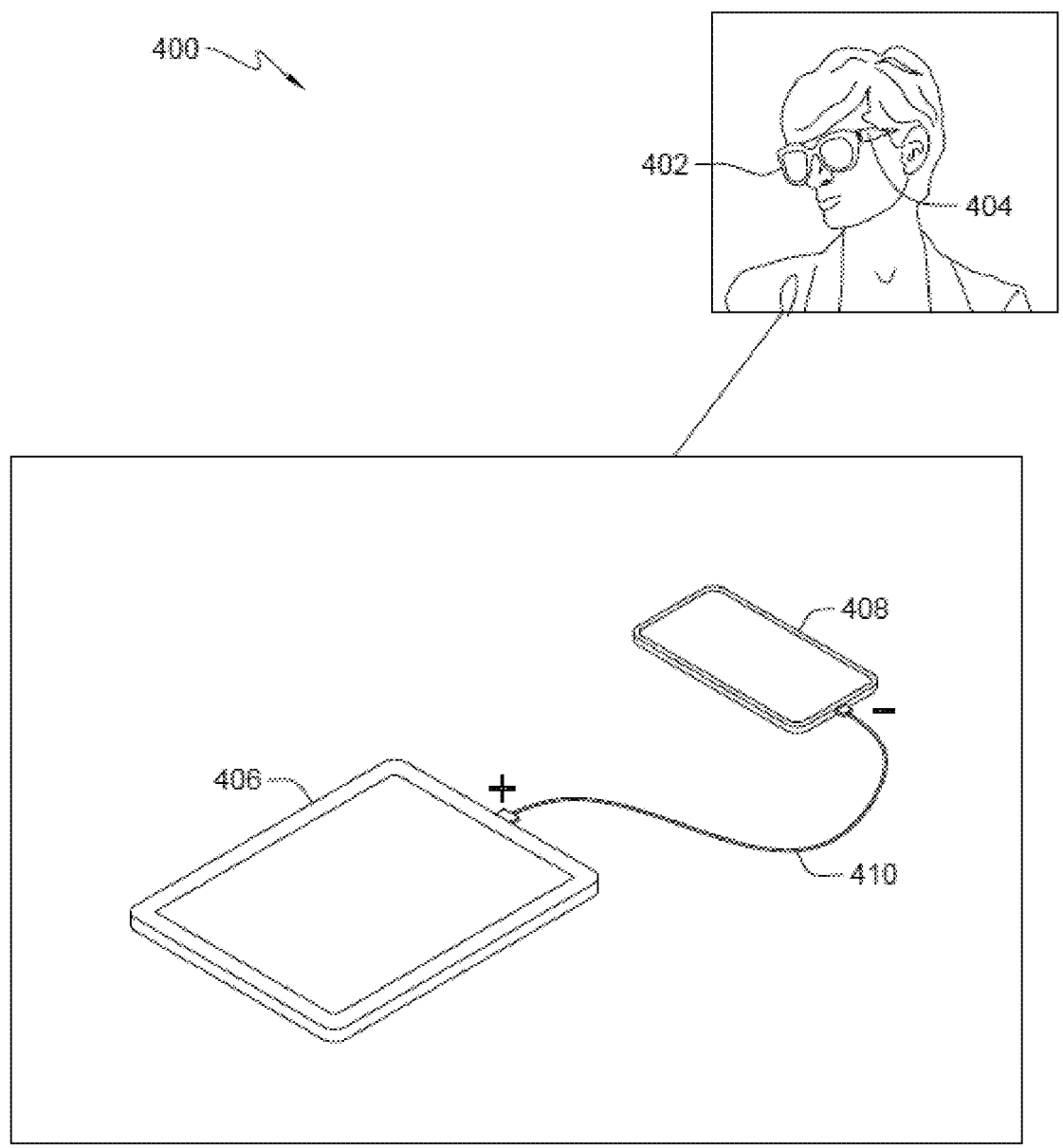
FIG. 4 depicts a block diagram of a user wearing augmented reality eyewear to determine power charging direction, according to at least one embodiment of the present invention.

FIG. 4 depicts block diagram 400. In various embodiments, block diagram 400 represents an augmented reality environment, where the augmented reality environment includes a user wearing an augmented reality eyewear or headset 402, sensors 404, two or more computing devices (i.e., computing device 406 and computing device 408), and a connection cable 410. In various embodiments, a user wears the augmented reality eyewear or headset 402 and sensors 404 track the user's eye movement and gestures and include video cameras to identify computing devices within the user's field of vision. In various embodiments, computing device 406 and computing device 408 are within the user's field of vision. Additionally, cable connection cable 410 operates to transfer DC power between computing device 406 and computing device 408. In various embodiments, a user of augmented reality eyewear or headset 402 designates the source device and the target device of the power recharging cycle.

In various embodiments, a user wears an augmented reality eyewear or headset 402 that includes sensors 404 that includes, but not limited to, an internal compass or a magnetic chip capable of identifying the cardinal direction and the field of visions of the user. In various embodiments, sensors 404 executing on augmented reality eyewear or headset 402 further includes, but is not limited to, an angular/linear position sensor that identifies the angle of the field of vision that the user is looking at (i.e., the user is looking down at a forty-five (45) degree angle, the user is looking up at a fifteen (15) degree angle). In various embodiments, augmented reality program 122 executing on augmented reality eyewear or headset 402 identifies one or more computing devices (i.e., computing device 406 and computing device 408) within the computing environment (i.e., computing environment 100). Additionally, in various embodiments, the one or more computing devices (i.e., computing device 406 and computing device 408) and the augmented reality eyewear or headset 402 are connected to a home network (i.e., network 110), where the augmented reality eyewear or headset 402 transfers data to computing device 406 and computing device 408.

In various embodiments, sensors 404 executing on augmented reality eyewear or headset 402 identifies the cardinal direction, angular, and linear direction of the user's field of vision and analyzes the user's eye movement and gestures. In various embodiments, augmented reality eyewear or headset 402 receives data from the one or more computing devices (i.e., computing device 406 and computing device 408), operating within the computing environment, regarding the placement and positioning of the one or more computing devices. In various embodiments, augmented reality program 122, executing on augmented reality eyewear or headset 402, correlates the positioning data of the one or more computing devices with the user's eye data (i.e., user's eye movement and gestures) and determines which computing device the user is focusing their gaze upon. In various embodiments, augmented reality program 122, executing on augmented reality eyewear or headset 402, utilizes R-CNN analysis (i.e., region-based convolutional neural network) where augmented reality program 122 is trained utilizing historical training data to identify and determine that one or more computing devices are present within the user's field of vision. In various embodiments, augmented reality program 122 correlates the determination of the computing device within the user's field of vision with the identification of the user's eye movements and gesture and determines which specific computing device the user is focusing their gaze upon.

Embodiments of the present invention provide that the user is capable of determining that a first computing device is the source device and that a second computing device is the target device of the power recharging cycle. In various embodiments, augmented reality program 122 identifies the user's eye gesture, where the user indicates one or more source devices and one or more target devices based on, at least, the eye gesture performed by the user. In various embodiments, the user's eye gesture includes, but is not limited to, (i) blinking with both eyes once, (ii) blinking with both eyes twice, (iii) blinking with the left eye, and (iv) blinking with the right eye. In various embodiments, the user can define the identification of the one or more source devices and the one or more target devices based on, at least, a pre-determined eye gesture. In one example embodiment, the user defines that blinking once with the user's left eye selects one or more source devices that the user's field of vision and gaze is upon and that blinking once with the user's right eye selects one or more target devices that the user's field of vision and gaze is upon. Additionally, in various embodiments, the user can define additional parameters that include, but are not limited to, (i) identifying the battery level of one or more computing devices and (ii) determining a threshold amount of power to transfer from the source device to the target device.

In various embodiments, augmented reality program 122 tracks the user's eye movements and gestures. In various embodiments, the user focuses their field of vision and gaze upon a first computing device and by blinking once with the user's left eye augmented reality program 122 determines that this is the source device. Additionally, in various embodiments, augmented reality program 122 tracks the user's field of vision and gaze towards a second computing device and identifies that the user blinks once with the user's right eye and augmented reality program 122 determines that the second computing device is the target device of the power recharging cycle. In various embodiments, augmented reality program 122 authorizes the user's request to initiate the power recharging cycle. In various embodiments, augmented reality program 122 authorizes the user's request to initiate the power recharging cycle utilizing, but not limited to, (i) a biometric scan and (ii) a computing device unique ID identifier. In various embodiments, augmented reality eyewear or headset 402 includes sensors 404 that are capable of analyzing the user's pupil and iris and communicates pupil and iris data to augmented reality program 122. In various embodiments, sensors 404 perform a biometric scan of the user's iris and pupil. In various embodiments, augmented reality program 122 analyzes the pupil and iris data and determines whether the authorized user, utilizing augmented reality eyewear or headset 402, performed a request to trigger the power recharging cycle between two or more computing devices. In various embodiments, augmented reality program 122 authorizes the user and triggers the power recharging cycle. In alternative embodiments, augmented reality program 122 does not authorize the user and triggers an end to the power recharging cycle.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
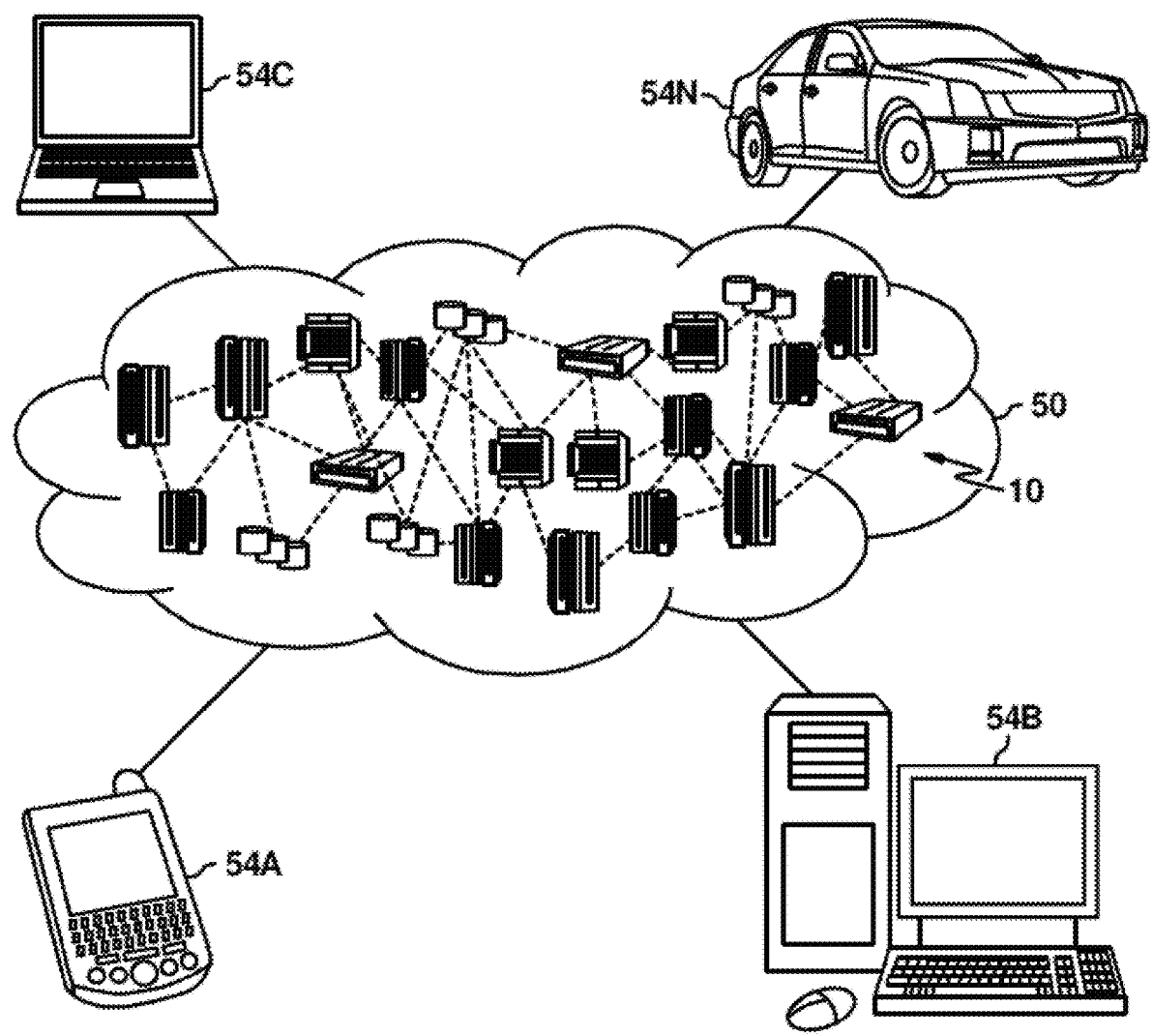
FIG. 5 depicts a cloud computing environment, according to at least one embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
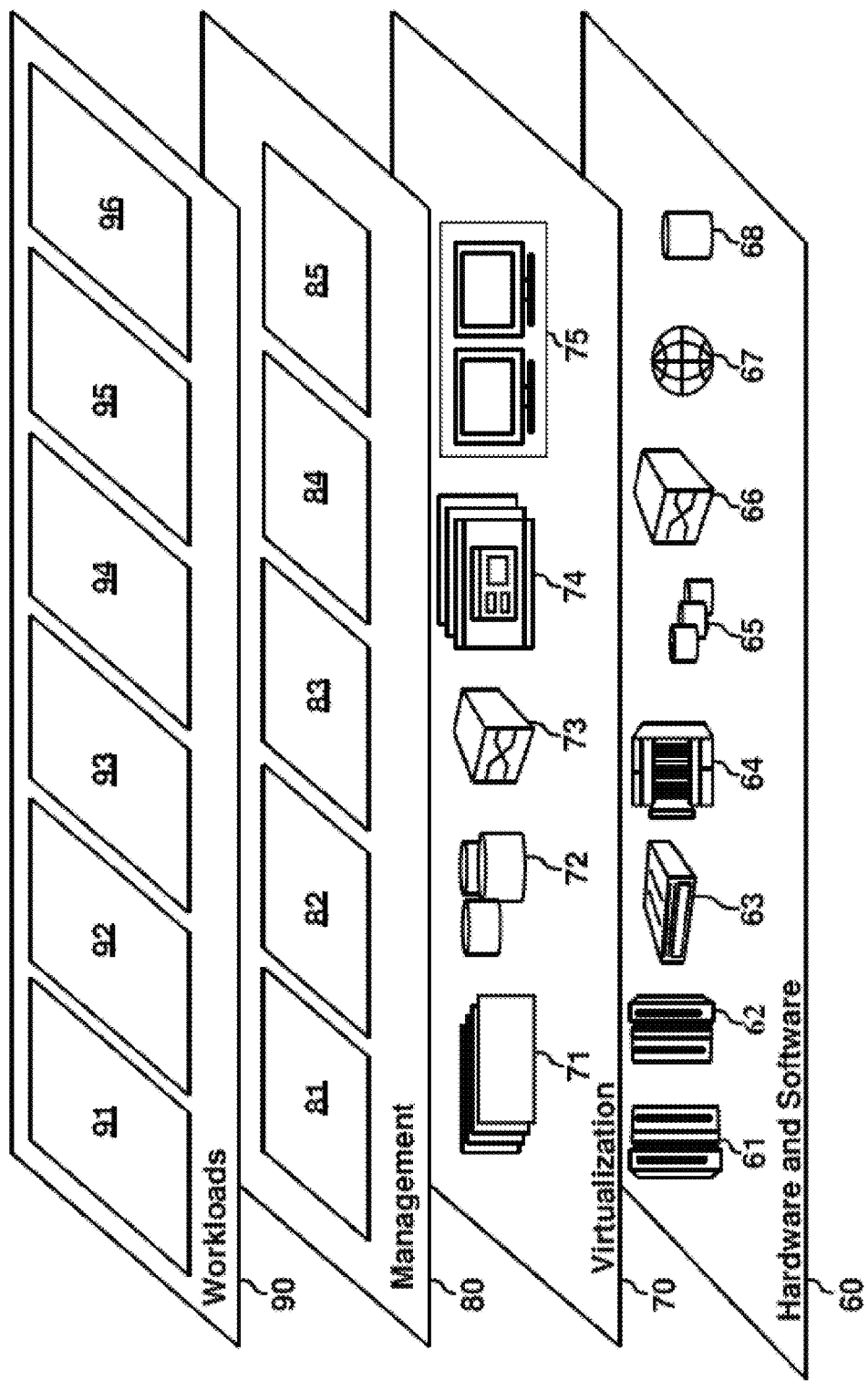
FIG. 6 depicts abstraction model layers, according to at least on embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

Figure 7:
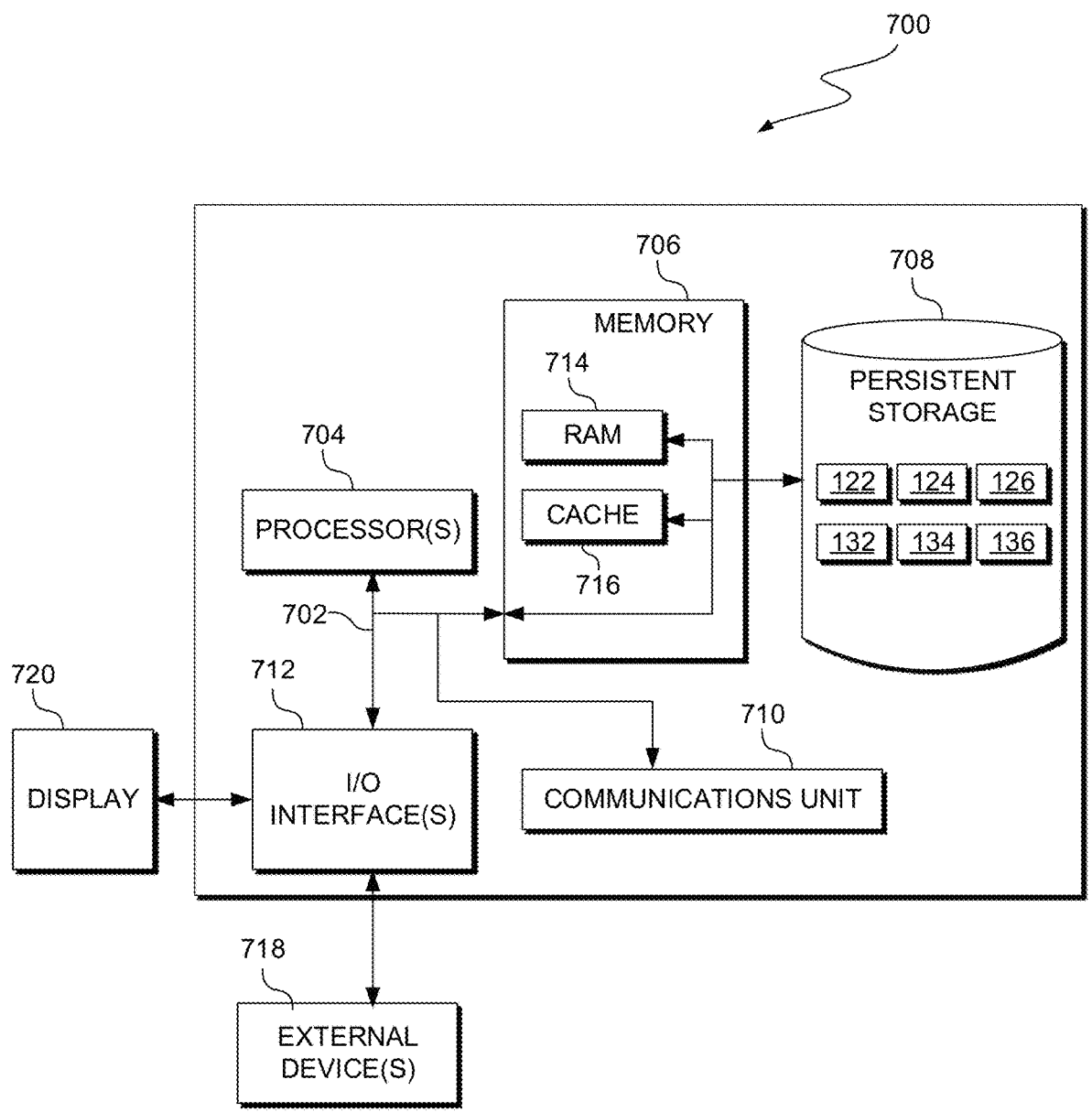
FIG. 7 depicts a block diagram of components of one or more computing devices within the computing environment depicted in FIG. 1, in accordance with an exemplary embodiment of the present invention.

FIG. 7 depicts a block diagram, 700, of components of computer system 120 and client IoT system 130, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computer system 120 IoT system 130 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

Augmented reality program 122, computer interface 124, sensors 126, database 128, client device 132, and client device 134 are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of network 110. In these examples, communications unit 710 includes one or more network interface cards. Communications unit 710 may provide communications through the use of either or both physical and wireless communications links. Augmented reality program 122, computer interface 124, sensors 126, database 128, client device 132, and client device 134 may be downloaded to persistent storage 808 through communications unit 710.

I/O interface(s) 712 allows for input and output of data with other devices that may be connected to computer system 120 and IoT system 130. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., augmented reality program 122, computer interface 124, sensors 126, database 128, client device 132, and client device 134 can be stored on such portable computer-readable storage media and can be loaded onto persistent storage 808 via I/O interface(s) 712. I/O interface(s) 712 also connect to a display 720.

Display 720 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method, the method comprising:
    training, by one or more processors, a neural network to determine power recharging directions between sets of computing devices based, at least in part, on: (i) historical computing device data, and (ii) historical user eye data;
    receiving, by one or more processors, from an augmented reality device, (i) computing device data pertaining to a first computing device and a second computing device, and (ii) user eye data pertaining to a user associated with the first computing device and the second computing device;

determining, by one or more processors, in real time, a power recharging direction between the first computing device and the second computing device using the augmented reality device, wherein the first computing device is identified as a source computing device based on the user eye data including a first blinking pattern when a gaze of the user is on the first computing device and the second computing device is identified as a target computing device based on the user eye data including a second blinking pattern when the gaze of the user is on the second computing device;

authenticating, by one or more processors, the first computing device and the second computing device prior to triggering a power recharging cycle; and triggering, by one or more processors, a power recharging cycle, wherein the source computing device transfers direct current (DC) power to the target computing device.

2. The computer-implemented method of claim 1, wherein:

the computing device data indicates that the target computing device has a battery power level below a first threshold value; and the computing device data indicates that the source computing device has a battery power level above a second threshold value.

3. The computer-implemented method of claim 1, wherein the user eye data identifies a field of vision of the user and a direction of eye movements of the user.

4. The computer-implemented method of claim 3, wherein the direction of the eye movements of the user is the power recharging direction.

5. The computer-implemented method of claim 1, the method further comprising:

determining, by one or more processors, that respective battery levels of the first computing device and the second computing device can no longer sustain a power transfer; and in response to determining that the respective battery levels of the first computing device and the second computing device can no longer sustain the power transfer, triggering, by one or more processors, an end to the power recharging cycle.

6. The computer-implemented method of claim 5, the method further comprising:

communicating, by one or more processors, an alert to the user indicating that the respective battery levels of the first computing device and the second computing device can no longer sustain the power transfer.

7. A computer program product, the computer program product comprising:

one or more computer-readable storage medium and program instructions stored on the one or more computer-readable storage medium, the stored program instructions comprising:

program instructions to train a neural network to determine power recharging directions between sets of computing devices based, at least in part, on: (i) historical computing device data, and (ii) historical user eye data;

program instructions to receive from an augmented reality device, (i) computing device data pertaining to a first computing device and a second computing device, and (ii) user eye data pertaining to a user associated with the first computing device and the second computing device;

program instructions to determine a power recharging direction between the first computing device and the second computing device based on historical data of a user comprising the received historical user eye data comprising eye movement and corresponding eye gestures, wherein the first computing device is identified as a source computing device based on the user eye data including a first blinking pattern when a gaze of the user is on the first computing device and the second computing device is identified as a target computing device based on the user eye data including a second blinking pattern when the gaze of the user is on the second computing device;

program instructions to authenticate the first computing device and the second computing device prior to triggering a power recharging cycle; and program instructions to trigger a power recharging cycle, wherein the source computing device transfers direct current (DC) power to the target computing device.

8. The computer program product of claim 7, wherein:

the computing device data indicates that the target computing device has a battery power level below a first threshold value; and the computing device data indicates that the source computing device has a battery power level above a second threshold value.

9. The computer program product of claim 7, wherein the user eye data identifies a field of vision of the user and a direction of eye movements of the user.

10. The computer program product of claim 9, wherein the direction of the eye movements of the user is the power recharging direction.

11. The computer program product of claim 7, the stored program instructions further comprising:

program instructions to determine that respective battery levels of the first computing device and the second computing device can no longer sustain a power transfer; and program instructions to, in response to determining that the respective battery levels of the first computing device and the second computing device can no longer sustain the power transfer, trigger an end to the power recharging cycle.

12. The computer program product of claim 11, the stored program instructions further comprising:

program instructions to communicate an alert to the user indicating that the respective battery levels of the first computing device and the second computing device can no longer sustain the power transfer.

13. A computer system, the computer system comprising:

one or more processors;

one or more computer readable storage medium; and program instructions stored on the one or more computer readable storage medium for execution by at least one of the one or more processors, the stored program instructions comprising:

program instructions to train a neural network to determine power recharging directions between sets of computing devices based, at least in part, on: (i) historical computing device data, and (ii) historical user eye data;

program instructions to receive from an augmented reality device, (i) computing device data pertaining to a first computing device and a second computing device, and (ii) user eye data pertaining to a user associated with the first computing device and the second computing device;
program instructions to determine a power recharging direction between the first computing device and the second computing device based on historical data of a user comprising the received historical user eye data comprising eye movement and corresponding eye gestures, wherein the first computing device is identified as a source computing device based on the user eye data including a first blinking pattern when a gaze of the user is on the first computing device and the second computing device is identified as a target computing device based on the user eye data including a second blinking pattern when the gaze of the user is on the second computing device; and
program instructions to trigger a power recharging cycle, wherein the source computing device transfers direct current (DC) power to the target computing device.

14. The computer system of claim 13, wherein:
the computing device data indicates that the target computing device has a battery power level below a first threshold value; and
the computing device data indicates that the source computing device has a battery power level above a second threshold value.

15. The computer system of claim 13, wherein the user eye data identifies a field of vision of the user and a direction of eye movements of the user.

16. The computer system of claim 15, wherein the direction of the eye movements of the user is the power recharging direction.

17. The computer system of claim 13, the stored program instructions further comprising:
program instructions to determine that respective battery levels of the first computing device and the second computing device can no longer sustain a power transfer; and
program instructions to, in response to determining that the respective battery levels of the first computing device and the second computing device can no longer sustain the power transfer, trigger an end to the power recharging cycle.

* * * * *